PHASE EQUILIBRIA DIAGRAM FOR $Cu_2S$-$Ag_2S$ EUTECTOID

United States Patent Office 3,483,140
Patented Dec. 9, 1969

3,483,140
TEMPERATURE SENSITIVE ELECTRICAL
CONTROL ELEMENT
Robert B. Graf, Glastonbury, Conn., assignor to United
Aircraft Corporation, East Hartford, Conn., a corporation of Delaware
Filed Mar. 18, 1966, Ser. No. 535,444
Int. Cl. H01b 1/06
U.S. Cl. 252—518   3 Claims

ABSTRACT OF THE DISCLOSURE

Disclosed are copper sulfide-silver sulfide and gold sulfide-silver sulfide compositions having abrupt changes in electrical resistivity at specific temperatures. They are useful as temperature responsive electrical devices.

---

This invention relates to a temperature sensitive electrical control element. More particularly, the invention pertains to a temperature sensitive electrical control element that exhibits an abrupt decrease in electrical resistivity when heated to a predetermined temperature.

It is well known that certain materials exhibit substantial and relatively abrupt changes in their resistivity when heated to their polymorphic transition temperatures which has been conveniently referred to as their switching temperatures. Examples of materials which exhibit the aforementioned property of rather abruptly changing resistivity at a characteristic temperature are silver sulfide ($Ag_2S$), iron sulfide (FeS), vanadium pentoxide ($V_2O_5$), vanadium dioxide ($V_2O_4$), vanadium trioxide ($V_2O_3$), vanadium monoxide (VO), molybdenum trioxide $MoO_3$), and titanium trioxide ($Ti_2O_3$).

The use of materials of the aforementioned type as the active element of a thermally responsive control element e.g. a switch, is limited since the particular temperature at which one may use such a material for effecting the control action is limited to the polymorphoric transition temperature of such materials. Hence, if a material such as $Ag_2S$ is used as the active component of a switch, such switch is only useful for operation at a temperature of 177° C., the polymorphic transition temperature of $Ag_2S$.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention consists in the novel steps, methods, compositions, combinations and improvements herein shown and described.

An object of this invention is to provide improved temperature sensitive electrical systems wherein one may obtain over a wide temperature range temperature-sensitive electrical elements that exhibit abrupt changes in resistivity when heated to a predetermined temperature within said wide temperature range.

A further object of this invention is to provide an improved temperature sensitive electrical control element whose active component is a solid which minimizes container problems.

It has been found that the objects of this invention may be realized by employing as the active component of a temperature sensitive electrical control element, a eutectoid composition which exhibits an abrupt change in resistivity when heated to a predetermined temperature. In order to obtain an eutectoid having the aforedescribed characteristics, it is essential that at least one component used in forming the eutectoid be of such nature that it exhibits an abrupt change in resistivity at its polymorphic transition temperature. Examples of materials of the aforementioned type useful in forming the eutectoid compositions used in accordance with this invention are compounds wherein the cation is selected from the group consisting of Group 1b of the Periodic Table and wherein the anion is selected from the group consisting of chalcogens (i.e. sulfur, tellurium and selenium) and halogens.

The eutectoid reaction in forming the eutectoid used in accordance with this invention involves a reaction in which two solids react at a definite temperature to form a single, high temperature solid solution. Above the eutectoid temperature only the solid solution is stable and below the eutectoid temperature only two solids are stable. Such a reaction temperature is not sensitive to small amounts of impurities because the reaction proceeds at the invariant temperature until one (or both) of the reactants is used up. Therefore, if the composition tested is slightly different from the eutectoid composition, the abrupt change in electrical resistivity occurs at the same temperature but is smaller in magnitude. Since all the phases involved are solid, the container problem is minimized when the eutectoid is employed as the active component of a temperature sensitive electrical central element.

In order to illustrate more specifically the type of eutectoid compositions useful in accordance with this invention, the following examples are given. In the examples which follow, reference is made to FIGURES 1–5 of the accompanying drawings. In the drawings.

EXAMPLE I

The system $Ag_2S$-$Cu_2S$

Figure 1:
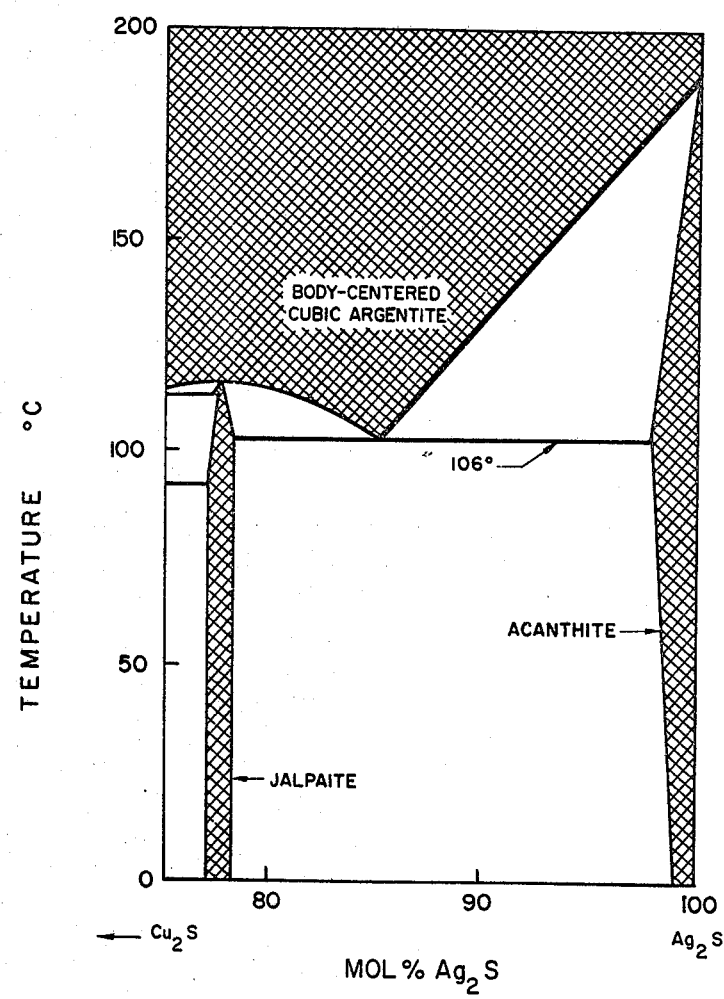
FIGURE 1 is a phase equilibria diagram for the $Cu_2S$-$Ag_2S$ eutectoid composition of Example 1.
Figure 2:
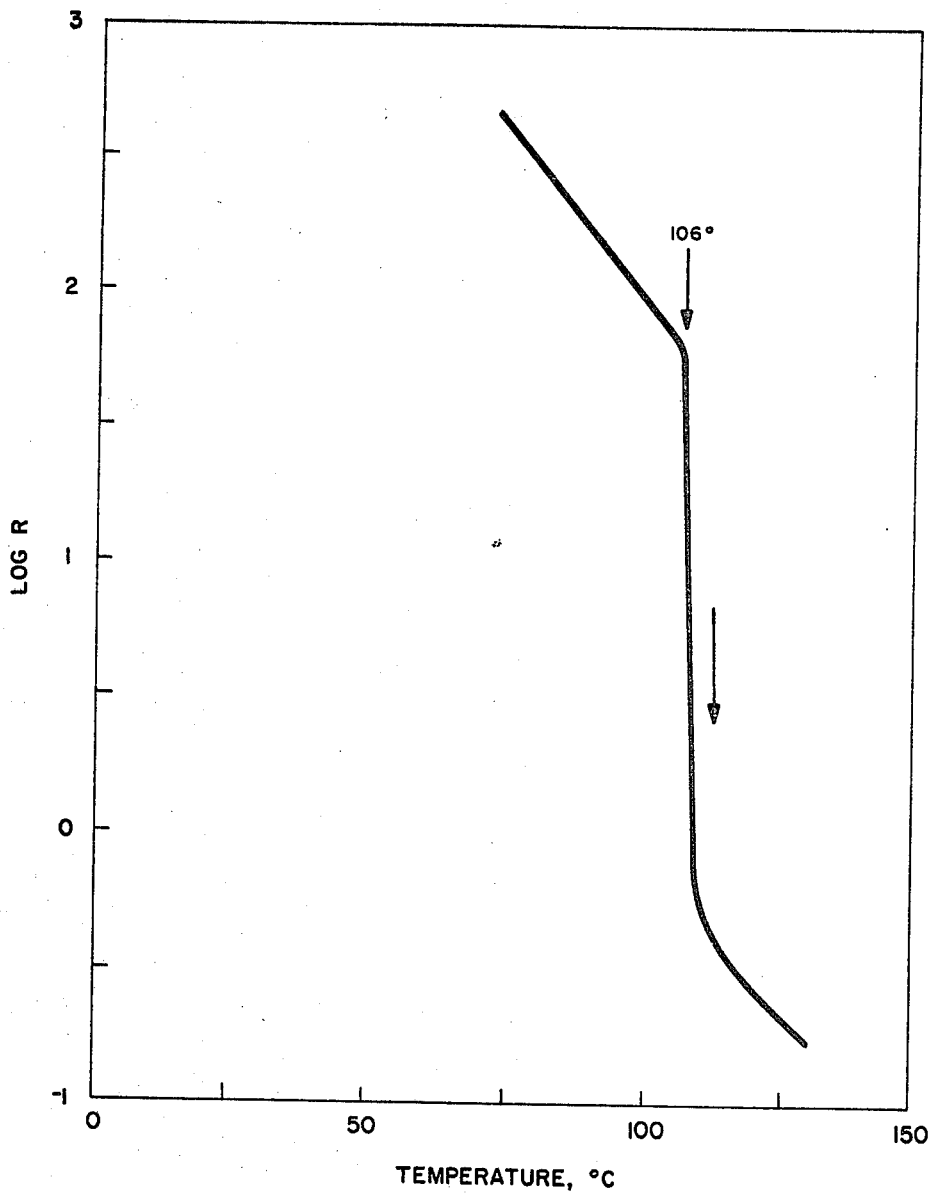
FIGURE 2 is a graph illustrating the change in resistivity of the eutectoid composition of Example 1 as the temperature varies.

The eutectoid composition of 85 mole percent $Ag_2S$ and 15% $Cu_2S$ reacts at a temperature of 106° to form a body-centered cubic phase (see FIG. 1). The low temperature compounds are Jalpaite (77% $Ag_2S$-23% $Cu_2S$) and Acanthite ($Ag_2S$). The resistivity change is more than two orders of magnitude at 106° C. (FIG. 2).

EXAMPLE II

The system $Ag_2S$-$Au_2S$

Figure 3:
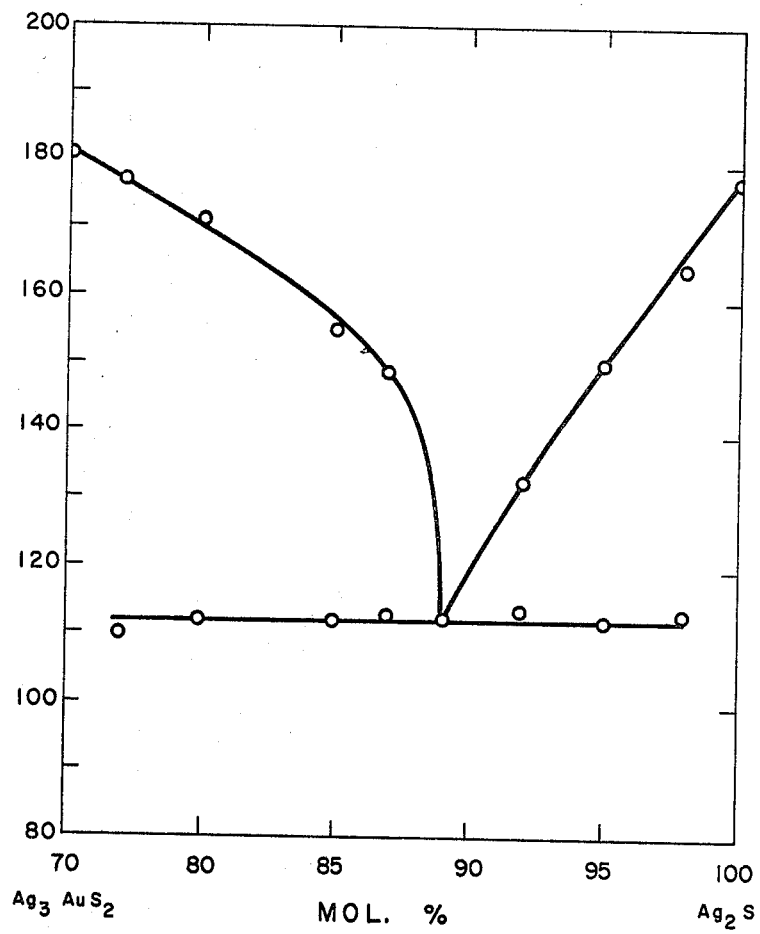
FIGURE 3 is a phase equilibria diagram for a different embodiment of a eutectoid composition useful in accordance with this invention, such eutectoid being the composition of Example 2.
Figure 4:
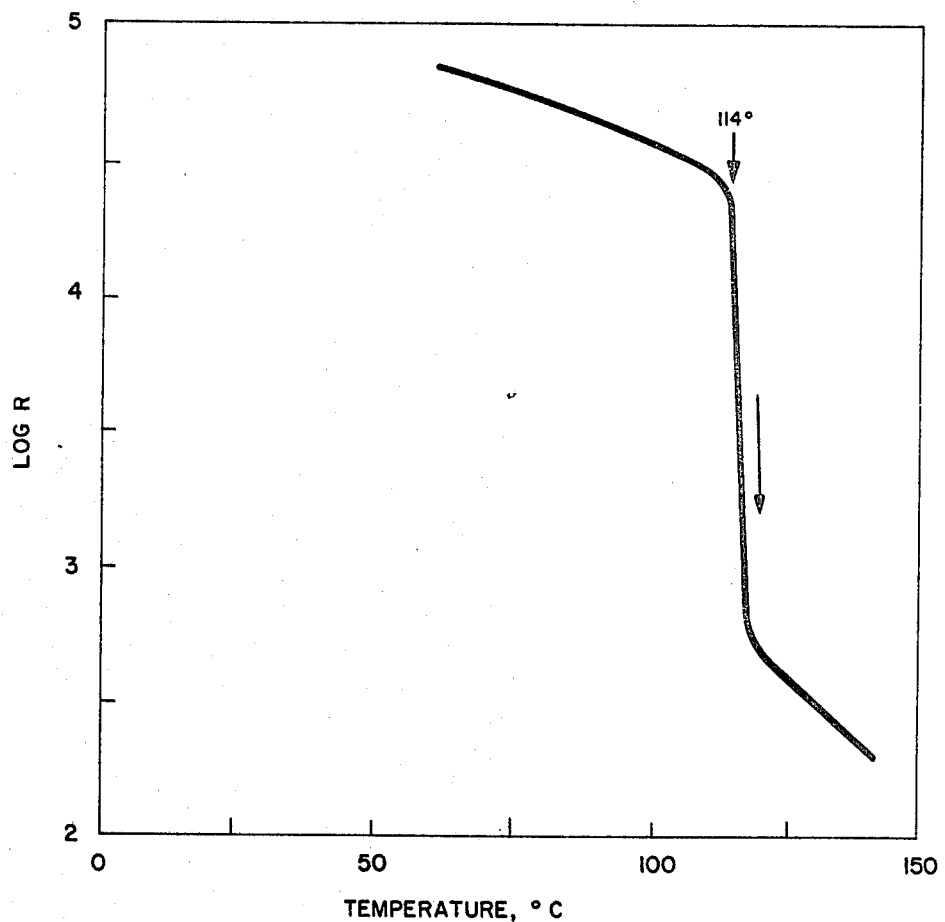
FIGURE 4 is a graph illustrating the change in resistivity of the eutectoid composition of Example 2 as the temperature varies.
Figure 5:
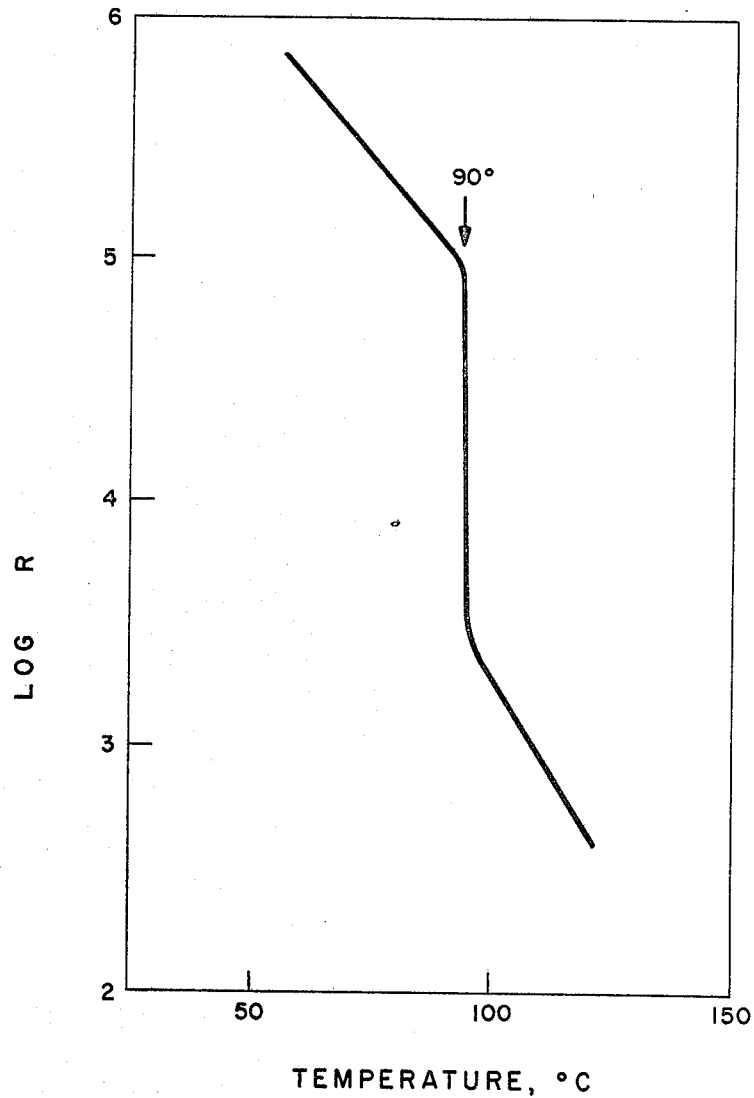
FIGURE 5 is a graph illustrating the change in resistivity of an AgI-AuI eutectoid composition.

A eutectoid composition of 89 mole percent $Ag_2S$ and 11% $Au_2S$ reacts at 114° to form a single high temperature phase. This composition was determined by electric resistivity measurements (FIG. 3). One of the low temperature forms is again Acanthite ($Ag_2S$) and the other is $Ag_3AuS_2$. The high temperature phase has the same crystal structure as in Example I. The resistivity change is approximately two orders of magnitude at 114° C. (FIG. 4).

The invention in its broader aspects is not limited to the specific steps, methods, compositions, combinations and improvements described, but departures may be made therefrom within the scope of the accompanying claims without departing from the principles of the invention and without sacrificing its chief advantages.

What is claimed is:

1. A method of sensing temperature at a particular selected temperature by an abrupt change in the electrical resistivity of a material thereat comprising using as a temperature sensitive element a material the composition of which consists of 85 mole percent of $Ag_2S$ and 15 mole percent of $Cu_2S$.

2. The method of claim 1 wherein the composition of the element consists of 89 mole percent of $Ag_2S$ and 11 mole percent of $Au_2S$.

3. A temperature sensitive electrical element having a composition consisting of 89 mole percent $Ag_2S$ and 11 mole percent $Au_2S$.

References Cited

UNITED STATES PATENTS 2,740,030   3/1956   Quinn _____ 252—518 XR

OTHER REFERENCES

Chemical Abstracts, vol. 50, col. 2264f.

LEON D. ROSDOL, Primary Examiner

J. D. WELSH, Assistant Examiner

U.S. Cl. X.R.

136—238; 252—500; 338—22, 25